United States Patent [19]
LeCover

[11] 3,715,963
[45] Feb. 13, 1973

[54] FILM TAKE-UP MAGAZINE AND ATTACHMENT ASSEMBLY THEREFOR

[76] Inventor: Maurice LeCover, 145 South Arden Boulevard, Los Angeles, Calif. 90004

[22] Filed: Sept. 3, 1971

[21] Appl. No.: 177,682

[52] U.S. Cl..................95/31 C, 242/71.1, 355/29
[51] Int. Cl............................................G03b 17/22
[58] Field of Search......95/31 R, 31 CA, 31 C, 34 A; 355/29; 242/71, 71.1

[56] References Cited

UNITED STATES PATENTS

| | | | |
|---|---|---|---|
| 3,408,909 | 5/1968 | Kisselmann et al. | 95/31 CA |
| 1,424,816 | 8/1922 | Grillone | 95/31 C |
| 2,545,196 | 3/1951 | Curioni | 95/31 C |
| 2,663,514 | 12/1953 | McArthur | 95/31 C |
| 3,132,573 | 5/1964 | Champlin et al. | 95/31 C |

FOREIGN PATENTS OR APPLICATIONS 735,683   6/1966   Canada..........................95/31 CA Primary Examiner—Joseph F. Peters, Jr.
Attorney—Flam & Flam

[57] ABSTRACT

A film take-up magazine includes a flat spring extending across the magazine interior. As additional convolutions of exposed film accumulate in the magazine, tangential film-spring contact displaces the spring to increase the effective size of the film receiving chamber. The magazine is attached to a camera by an assembly including a lever operated latch. The same lever moves a knife edge plate to sever the exposed film and to cover the film exit aperture when the magazine is detached from the camera.

8 Claims, 7 Drawing Figures

PATENTED FEB 13 1973

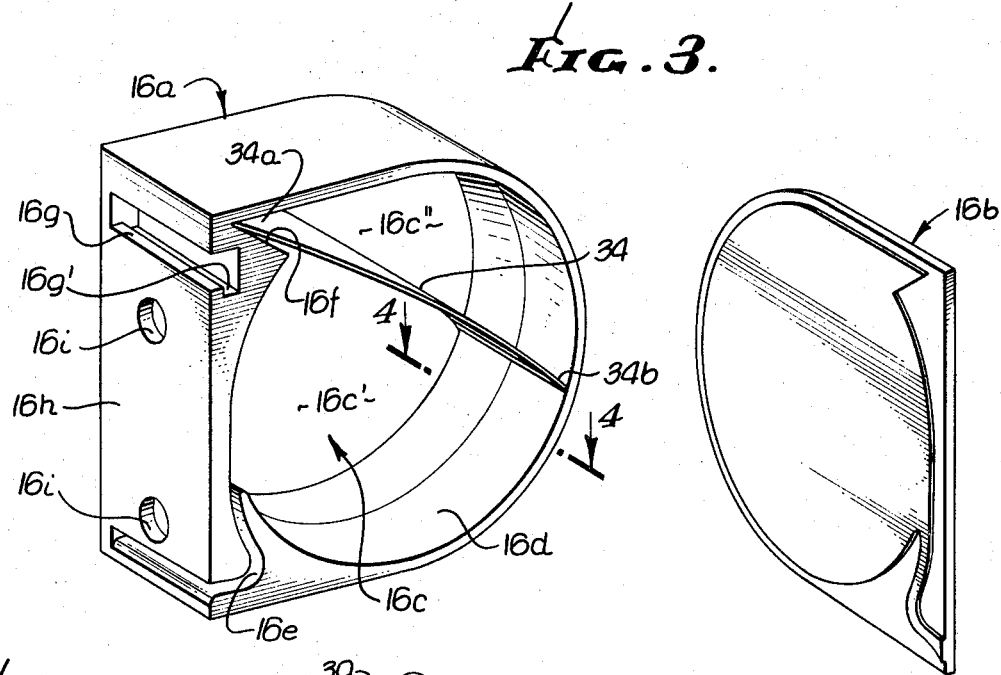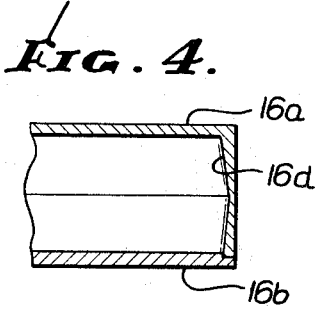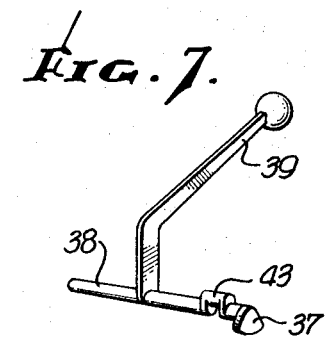

FILM TAKE-UP MAGAZINE AND ATTACHMENT ASSEMBLY THEREFOR

BACKGROUND OF THE INVENTION

1. Field of the Invention

The present invention relates to a removable film take-up magazine having a film receiving chamber of variable effective size, and to a camera attachment assembly for the magazine.

2. Description of the Prior Art.

In a film strip camera, film supplied from a preloaded cassette is advanced through the camera, exposed one frame at a time, and fed into a take-up magazine. By using a removable take-up magazine, when the desired pictures have been taken, the used film can be severed from the unexposed supply and the magazine detached to allow development of only the exposed frames.

Advantageously, the removable take-up magazine includes no mechanism for winding the exposed film. Such mechanisms necessitate drive gears, sprocket wheels and the like, require interconnection with the camera advance system, and complicate loading of the film into the take-up magazine. It is far more desirable to employ a take-up magazine into which the exposed film is freely inserted through a light tight passageway. The camera advance mechanism merely pushes the film into the magazine. A simple, inexpensive magazine should result.

However, a significant problem is encountered in such driveless take-up magazines. The inserted film tends to coil in the take-up chamber, the convolutions gradually increasing in diameter as more film is exposed. If the take-up chamber is of constant effective diameter, the sliding of the convolutions against each other or against the magazine sidewall causes a substantial breaking effect as the film is pushed into the chamber. This frictional binding occurs only when a few convolutions have been formed, and prevents any additional film from being inserted into the take-up magazine.

A number of solutions have been suggested in the past. Thus, Mihalyi In U.S. Pat. No. 2,336,278 and Horton et al., a U.S. Pat. No. 2,614,763, both utilize loose curved leaf springs to assist coiling of exposed film within the take-up chamber of a camera. The curved spring forms a yieldable periphery for the film receiving chamber, but substantial frictional surface contact remains between the coiled film and the conformally curved spring.

Ernisse, in U.S. Pat. No. 2,578,295, suggests a take-up chamber comprising an inverted, truncated conical cover suspended within the camera body by a loose spring. As the exposed film enters the chamber, the upper edge of the film rides against, and is coiled by the inclined wall of the cover. When the convolutions increase in size, the cover is pushed upward so that a larger effective chamber diameter is achieved.

A quite different approach is shown in the U.S. Pat. No. 3,057,573 to Kindig et al. Therein, the camera take-up chamber is provided with three rollers situated at the apices of a triangle. One roller is stationary, and the other two are free to move away from the stationary roller to accommodate the increasing diameter of the exposed film convolutions.

The above mentioned approaches all have been utilized within the camera body, and none is particularly adaptable for use in a removable take-up magazine. An object of the present invention is to provide a removable take-up magazine having a simple mechanism to prevent binding of the coiled, exposed film. Further use of a removable magazine is complimented by apparatus to sever the exposed film from the supply reel, and to provide a light tight cover for the exposed film exit aperture of the camera. Another object of the present invention is to provide a camera attachment assembly having such features.

SUMMARY OF THE INVENTION

To accomplish the foregoing objectives, there is provided a removable up magazine into which exposed film is fed through a light tight passageway. The magazine interior has a concave sidewall configuration. Extending across the magazine interior is a thin, flat spring defining a film receiving chamber. The spring is longer than the chamber diameter and an end of the spring seats within a notch extending laterally from the chamber; this arrangement requires no hardware to mount the spring. As inserted film convolutions increase in diameter, the film comes into tangential contact with the flat spring. Pressure of the film displaces the spring, thereby effectuating a take-up chamber of increasing effective size. The minimal friction of tangential spring contact, and edge-only contact with the chamber sidewall insures that the film will not bind within the take-up magazine.

The magazine is simply attached to a camera by a lever operated latch which engages a cut-out on the same exterior face of the magazine which contains the film entrance slot. The lever also moves a knife-edged plate which severs the exposed film as the magazine is unlatched from the camera. The plate covers the film exit aperture while the magazine is detached from the camera.

BRIEF DESCRIPTION OF THE DRAWINGS

A detailed description of the invention will be made with reference to the accompanying drawings, which are to scale. Like numerals designate corresponding parts in the several figures.

FIG. 3 is a perspective view of the inventive take-up magazine; for clarity the top is shown removed.

FIG. 4 is a fragmentary, transverse sectional view as seen along the line 4—4 of FIG. 3, showing the concave sidewall configuration of the take-up magazine.

FIG. 5 is a side elevation view of the magazine attachment assembly used in the filmstrip camera of FIG. 2, as seen generally along the line 5—5 thereof; the latch and film cutting plate are shown in the magazine-attached position, but for clarity the magazine itself is not shown.

FIG. 6 is a view like that of FIG. 5, but with the magazine latch and film cutting plate shown in the magazine-removed position.

FIG. 7 is a perspective view of the magazine latch lever arm used in the assembly of FIGS. 5 and 6.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
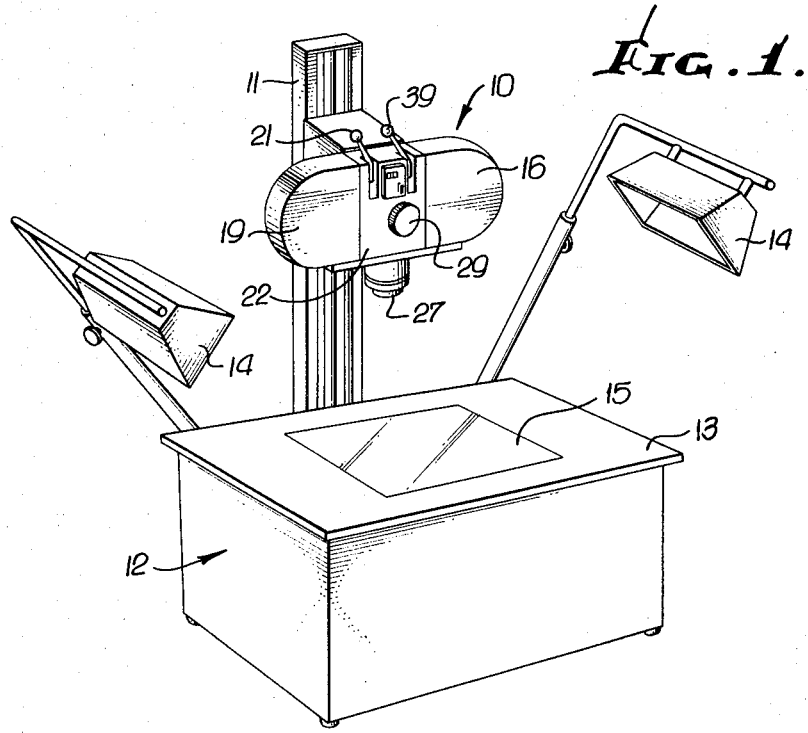
FIG. 1 is a perspective view of a copy stand and filmstrip camera incorporating the inventive film take-up magazine and attachment assembly.

Referring now to the drawings, and particularly to FIG. 1 thereof, there is shown a filmstrip camera 10 mounted on the vertical column 11 of a copy stand 12. An article to be photographed is placed on the table top 13 of the stand 12 and illuminated from above by a pair of lamps 14 or from below by a table mounted light box 15. The camera 10, shown in greater detail in FIG. 2, incorporates a take-up magazine 16 and a magazine attachment assembly, generally designated 17, both in accordance with the present invention.

Figure 2:
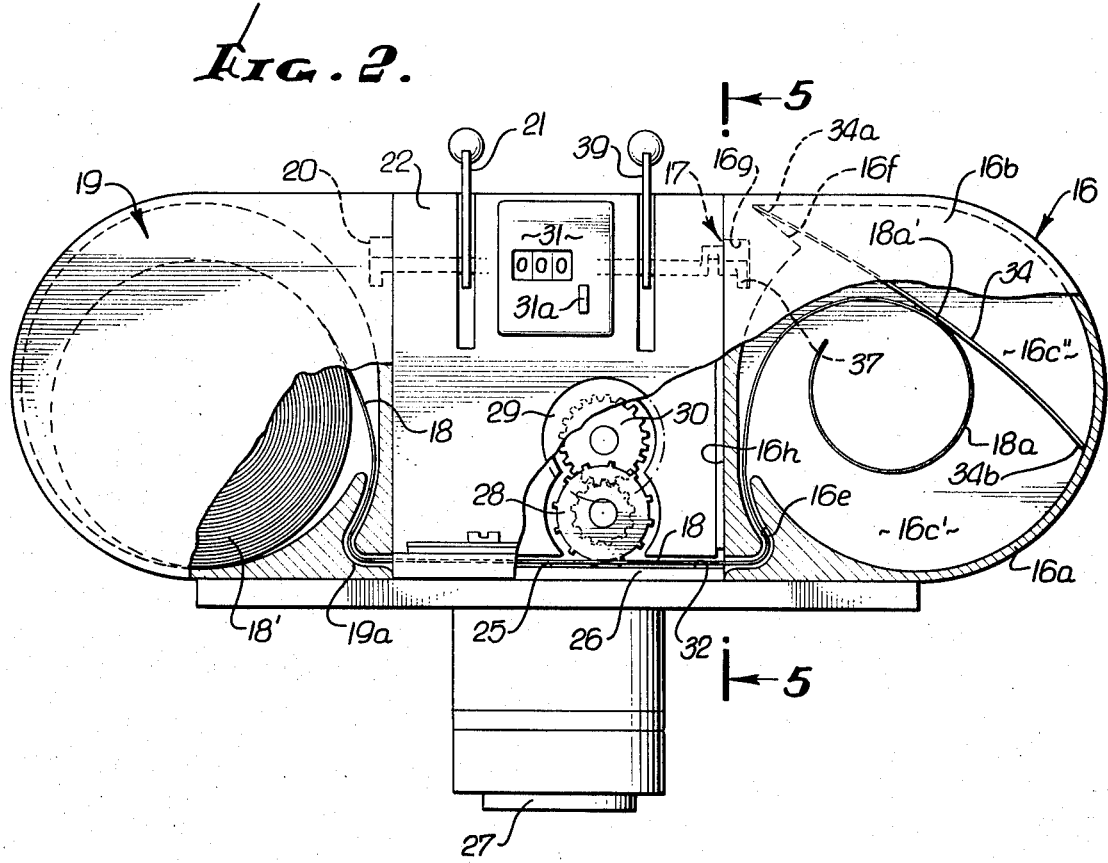
FIG. 2 is an elevation view, partly broken away and in section, of the filmstrip camera and take-up magazine also shown in FIG. 1.

Referring to FIG. 2, a film 18 is fed through the camera 10 from a supply magazine 19 which may be of identical configuration as the take-up magazine 16. A latch 20 controlled by a lever 21 attaches the supply magazine 19 to the camera body 22.

The supply magazine 19 typically will be loaded with a roll 18' containing many feet of unexposed film. The film 18 exits the magazine 19 via a light tight passageway 19a into a guide channel 25 extending immediately behind an aperture plate 26 attached to the camera body 22. The channel 25 maintains the film 18 in the focal plane of a lens 27 provided with a shutter for exposure of the film. The film 18 is advanced one frame at a time by a sprocket wheel 28 driven by an automatic advance mechanism (not shown) or manually using a knob 29 and a sprocket drive gear 30. A counter 31 reset by a push button 31a tallies how many film frames have been exposed. The exposed film 18 leaves the camera body 22 through an exit aperture 32 directly into the take-up magazine 16.

Details of the take-up magazine 16 are shown in FIGS. 2, 3 and 4. The magazine 16 includes a unitary bottom member 16a which receives a top 16b to define a housing having a generally cylindrical interior chamber 16c. The height of the chamber 16c is slightly greater than the width of the film 18. The interior sidewall 16d around the chamber 16c is concave, (FIG. 4) to insure contact only with the elongate edges of the film 18; this reduces the film-sidewall binding force, and prevents scratching or other damage to the film. A passageway 16e permits insertion of the exposed film 18 into the chamber 16c, but is doubled back to prevent light entry.

The magazine chamber 16c is divided into a film receiving region 16c' and another region 16c'' by a thin, flat leaf spring 34. The spring 34 has a length greater than the diameter of the chamber 16c, but is accommodated by a generally triangular notch or recess 16f extending laterally from the chamber 16c. One end 34a of the spring 34 seats within the recess 16f, and the other spring end 34b rests against the sidewall 16d. With this arrangement no fasteners are necessary to retain the spring 34 in place.

As evident in FIG. 2, the exposed film 18 is guided through the light tight passageway 16e into the film receiving chamber 16c'. The natural curl of the exposed film will cause the film to start coiling, as indicated at 18a. As more exposed film is fed to the magazine 16, the film convolutions 18a will increase in size, and will come into tangential or line contact, as at 18a', with the flat spring 34. The minimal friction resultant from such tangential contact will not cause binding of the film 18, and more exposed film readily can be fed into the take-up magazine 16. As additional film accumulates in the chamber 16c', the film convolutions 18a will increase in diameter sufficiently to displace the spring 34 toward the magazine sidewall 16c. Thus the size of the film receiving chamber 16c' effectively is increased, however, line contact between the film 18a and the spring 34 effectively is maintained.

The magazine attachment assembly 17 (FIG. 2) includes a latch 37 which engages a cut-out 16g (FIG. 3) in the planar face 16h of the magazine 16. The latch 37 is situated at the end of a unitary shaft 38 (FIGS. 2 and 7) attached to a lever 39. When the lever 39 is in the position shown in FIGS. 2 and 5, the latch 37 hooks into the recess 16g' of the cut-out 16g to secure the magazine 16 to the camera body 22. When the lever 39 is moved to the position shown in FIG. 6, the latch 37 disengages the recess 16g', and the magazine 16 can be removed.

The assembly 17 further comprises a frame 40 (FIGS. 5 and 6) which receives the magazine face 16h, and which holds a plate 41 having at one end a knife edge 41a. The plate 41 also is retained by a pair of screws 42 which extend through elongate slots 41b permitting the plate 41 to reciprocate within the frame 40. The heads of the screws 42 fit into clearance holes 16i when the magazine 16 is latched to the camera body 22. A cam 43 integral with the shaft 38 cooperates with a slot 41c to drive the plate 41 between the positions shown in FIGS. 5 and 6.

When the magazine 16 is attached to the camera body 22 (FIG. 5), the plate knife edge 41a is spaced away from the end 26a of the aperture plate 26, so that the film exit aperture 32 is unblocked. The exposed film 18 can pass freely through the aperture 32 into the magazine inlet passageway 16e.

When the magazine 16 is released by moving the lever 39 to the position shown in FIG. 6, the plate 41 is moved downward and the knife edge 41a cooperates with the aperture plate edge 26a to cut off the exposed film 18. Thus the magazine 16 can be removed without pulling additional film from the camera body 22. Further, the plate 41 blocks the exit aperture 32 and prevents light from entering the camera body 22 to fog the film 18 while the magazine 16 is detached. When the magazine 16 is replaced and the lever 39 again raised to the position shown in FIG. 5, the exit aperture 32 is opened, and the magazine 16 immediately is ready to receive additional exposed film 18a from the camera 10.

Thus there is provided a novel film take-up magazine of simple construction which permits a large amount of film to be received without binding, and a magazine attachment assembly which facilitates automatic severence of the film and blockage of the film exit aperture when the take-up magazine is detached from the camera.

Intending to claim all novel, useful and unobvious features shown or described, the applicant claims:

1. A film take-up magazine for a camera, comprising:

a housing having (a) a sidewall defining a generally cylindrical chamber of height slightly greater than the width of said film, (b) a light tight passageway through said sidewall for insertion of film into said chamber, (c) a spring receiving recess in said sidewall, and a flat spring of length greater than the chamber diameter and disposed across said chamber with an end in said recess, increasing convolutions of inserted film displacing said spring to increase the effective size of the film receiving region of said chamber.

2. A film take-up magazine according to claim 1 wherein the width of said flat spring is approximately equal to said film width, said spring end being parallel to the axis of said cylindrical chamber.

3. A film take-up magazine according to claim 1 wherein said sidewall is interiorly concave, and wherein said recess comprises a generally triangular notch extending laterally from said chamber.

4. A film take-up magazine according to claim 1 wherein said housing includes a planar, exterior attachment face parallel to the axis of said cylindrical chamber, said passageway extending to said face.

5. In combination:

a film take-up magazine according to claim 4, and means for attaching said magazine exterior face to a camera, exposed film advanced by said camera being inserted into said chamber via said passageway.

6. The combination according to claim 5 wherein said means comprises a cammed latch extending from said camera, a cut-out in said magazine exterior face receiving said latch, said cut-out being adjacent to but separated by said sidewall from said spring receiving recess.

7. The combination according to claim 4 wherein said camera includes a knife edged plate, means for latching said magazine to said camera with said exterior face in parallel adjacent relation with said plate, and for causing said plate to move parallel to said face so that said knife edge cuts said film as said magazine is unlatched from said camera.

8. A camera having a removable film take-up magazine and a magazine attachment assembly, said magazine comprising; a housing having a planar attachment face including a slit-like light tight passageway for insertion of exposed film into a chamber within said housing, said chamber being generally cylindrical and of height slightly greater than the width of said film, a flat spring extending across said chamber to define a film receiving region thereof, the length of said spring being greater than the diameter of said chamber, an end of said spring being situated in a notch extending laterally from said chamber, said planar attachment face also including a latch receiving cut-out, said attachment assembly comprising; a generally rectangular magazine receiving frame attached to said camera, a lever operated latch extending generally perpendicular to said frame for engaging said latch receiving cut-out to attach said magazine to said camera body with said attaChment face against said frame, a knife edged plate mounted within said frame for reciprocal motion in response to operation of said lever, the knife edge of said plate severing film supplied to said magazine and covering the film exit aperture of said camera when said lever is moved to a magazine releasing position, said plate uncovering said exit aperture to permit insertion of exposed film from said camera into said magazine when said lever is in a magazine attaching position.

* * * * *